United States Patent
Ashley et al.

(10) Patent No.: US 9,535,731 B2
(45) Date of Patent: Jan. 3, 2017

(54) DYNAMIC SECURITY SANDBOXING BASED ON INTRUDER INTENT

(71) Applicant: International Business Machines Corporation, Armonk, NY (US)

(72) Inventors: Paul A. Ashley, Toowong (AU); Anthony M. Butler, Dubai (AE); Ghada M. ElKeissi, Dubai (AE); Leny Veliyathuparambil, Winnipeg (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/550,321

(22) Filed: Nov. 21, 2014

(65) Prior Publication Data

US 2016/0149950 A1    May 26, 2016

(51) Int. Cl.
*G06F 11/00* (2006.01)
*G06F 9/455* (2006.01)
*H04L 29/06* (2006.01)

(52) U.S. Cl.
CPC ....... *G06F 9/45533* (2013.01); *H04L 63/1491* (2013.01)

(58) Field of Classification Search
CPC .............. H04L 63/1466; H04L 63/1491; G06F 9/45533
See application file for complete search history.

(56) References Cited

U.S. PATENT DOCUMENTS

| 7,383,578 | B2 | 6/2008 | Blake et al. |
| 7,694,339 | B2 | 4/2010 | Blake et al. |
| 7,904,959 | B2 | 3/2011 | Sidiroglou et al. |
| 8,181,250 | B2 | 5/2012 | Rafalovich et al. |
| 2002/0184528 | A1 | 12/2002 | Shevenell et al. |
| 2004/0078592 | A1 | 4/2004 | Fagone et al. |
| 2006/0021029 | A1* | 1/2006 | Brickell .................. G06F 21/51 726/22 |

(Continued)

FOREIGN PATENT DOCUMENTS

| CN | 102739647 A | 10/2012 |
| CN | 102790778 A | 11/2012 |
| CN | 102088379 B | 3/2013 |

OTHER PUBLICATIONS

Kai-Cheong et al. "Design of Application Layer Services for Security Automation via a Web Service Approach," Journal of Advances in Computer Networks, vol. 2, No. 1, Mar. 2014, pp. 76-84.*

(Continued)

*Primary Examiner* — Luu Pham
*Assistant Examiner* — Canh Le
(74) *Attorney, Agent, or Firm* — Law Offices of Ira D. Blecker, P.C.

(57) ABSTRACT

A method of security sandboxing which may include detecting an illicit intrusion to a computer on a first computer system; cloning the intruded computer; directing all traffic from the illicit intrusion to the cloned computer; observing activities of the illicit intrusion interacting with the cloned computer; and dynamically adapting the cloned computer to perform activities of predicted interest to the illicit intrusion based on the observed activities of the illicit intrusion. The steps of the method may be performed by one or more computing devices.

15 Claims, 5 Drawing Sheets

(56) References Cited

U.S. PATENT DOCUMENTS

| | | | | |
|---|---|---|---|---|
| 2006/0143709 | A1* | 6/2006 | Brooks | H04L 63/1408 726/23 |
| 2006/0161982 | A1 | 7/2006 | Chari et al. | |
| 2009/0241109 | A1* | 9/2009 | Vandegrift | G06F 9/445 718/1 |
| 2010/0269175 | A1 | 10/2010 | Stolfo et al. | |
| 2011/0145926 | A1* | 6/2011 | Dalcher | G06F 11/3466 726/26 |
| 2013/0191924 | A1* | 7/2013 | Tedesco | G06F 21/00 726/26 |
| 2013/0246685 | A1* | 9/2013 | Bhargava | G06F 21/00 711/6 |
| 2014/0229936 | A1* | 8/2014 | Gaonkar | G06F 9/45558 718/1 |
| 2014/0380007 | A1* | 12/2014 | Suen | G06F 3/0604 711/162 |
| 2016/0021130 | A1* | 1/2016 | Gafni | H04L 63/1425 726/23 |
| 2016/0028764 | A1* | 1/2016 | Vasseur | H04L 63/1458 726/23 |

OTHER PUBLICATIONS

Peter M. Chen et al. "When Virtual is Better Than Real," 2001 IEEE, pp. 133-138.*

Xinwen Fu et al., "Camouflaging Virtual Honeypots", downloaded from the Internet, <URL:http://www.homepages.dsu.edu/fux/paper/camouflagingHoneyd.pdf>, 2005 all pages.

Vusal Aliyev, "Using Honeypots to Study Skill Level of Attackers Based on the Exploited Vulnerabilities in the Network", Masters Thesis, Chalmers University of Teohnology,Göteborg, Sweden, downloaded from the Internet, <URL:http://publications.lib.chalmers.se/records/fulltext/129915.pdf>, 2010, all pages.

Jan Gerrit Gobel, "Advanced Honeynet Based Intrusion Detection", Diploma Thesis, <URL:https://pi1.informatik.uni-mannheim.de/filepool/theses/diplomarbeit-2006-goebel.pdf>, Jul. 27, 2006, all pages.

"Fermented Honeypot", DSL Report Forums, downloaded from the Internet on Aug. 28, 2014, <URL: http://www.dslreports.com/forum/r21736448-Fermented-Honeypot>, all pages.

"Advanced Persistent Threat (APT) Attack & Zero-Day Protection", downloaded from the Internet on Aug. 28, 2014, <URL: http://www.fireeye.com/>, all pages.

"Glastopf Honeypot Project Page", downloaded from the Internet on Aug. 28, 2014, <URL: http://glastopf.org/>, all pages.

"Honeyd Frequently Asked Questions", downloaded from the Internet on Aug. 28, 2014, <URL: http://www.honeyd.org/faq.php>, all pages.

"InfoSec Handlers Diary Blog—Roundcube Webmail follow-up", downloaded from the Internet on Aug. 28, 2014, <URL: https://isc.sans.edu//diary/Roundcube+Webmail+follow-up/5686>, all pages.

"Content security software—Internet Security & Cloud—Trend Micro USA", downloaded from the Internet on Aug. 28, 2014, <URL: http://www.trendmicro.com/us/index.html>, all pages.

* cited by examiner

DYNAMIC SECURITY SANDBOXING BASED ON INTRUDER INTENT

BACKGROUND

The present exemplary embodiments relate to network security and, more particularly, relate to the cloning of a compromised machine to a controlled environment.

Hacking, defacement and other forms of computer intrusion remain significant threats to enterprises, small businesses and governments. Current approaches typically address the issue by detecting and alerting access or by detecting and blocking such access. For example, a firewall or Intrusion Prevention System (IPS) may monitor the flow of traffic into a given server and block any attempts that appear to be made with the intent of gaining unauthorized access, such as via SQL injection or similar.

The drawbacks of these solutions are at least twofold. First, often the compromises involve new or as yet unknown attack vectors—so-called "zero day" vulnerabilities—and by blocking a request, the opportunity to better understand the attack vector and the technique cannot be taken advantage of. Further, by blocking the request, the ability to build future defenses is reduced as often the attack is blocked but the preceding events and future events are not known and these may expose other vulnerabilities.

Second, when an attack is blocked, it is very difficult to trace and identify the intruder as their connection to the server is ephemeral. Difficulty in tracing and identifying the culprits is not in the interests of the company and also not in the broader interests of the community as the attackers may go on to carry out other attacks.

On the other hand, prolonging the access that the intruder has to the compromised machine in order to allow time for them to be traced can extend the risk that the company is exposed.

Accordingly, a balance needs to be found between blocking access by the intruder and allowing the intruder prolonged access to the compromised machine.

BRIEF SUMMARY

The various advantages and purposes of the exemplary embodiments as described above and hereafter are achieved by providing, according to a first aspect of the exemplary embodiments, a method of security sandboxing which includes: detecting an illicit intrusion to a computer on a first computer system; cloning the intruded computer; directing all traffic from the illicit intrusion to the cloned computer; observing activities of the illicit intrusion interacting with the cloned computer; and dynamically adapting the cloned computer to perform activities of predicted interest to the illicit intrusion based on the observed activities of the illicit intrusion. The steps of the method are performed by one or more computing devices.

According to a second aspect of the exemplary embodiments, there is provided a computer program product for dynamic security sandboxing based on intruder intent. The computer program product including a computer readable storage medium having computer readable program code embodied therewith. The computer readable program code including: computer readable program code configured to detect an illicit intrusion to a computer on a first computer system; computer readable program code configured to clone the intruded computer; computer readable program code configured to direct all traffic from the illicit intrusion to the cloned computer; and computer readable program code configured to dynamically adapt the cloned computer to perform activities of predicted interest to the illicit intrusion based on the observed activities of the illicit intrusion.

According to a third aspect of the exemplary embodiments, there is provided a method of providing a security sandboxing service to a customer including: detecting an illicit intrusion to a computer on a first computer system of a first party; cloning the intruded computer; directing all traffic from the illicit intrusion to the cloned computer; observing activities of the illicit intrusion interacting with the cloned computer; dynamically adapting the cloned computer to perform activities of predicted interest to the illicit intrusion based on the observed activities of the illicit intrusion; performing on a second computer system of a second party at least one of the steps of detecting, cloning, directing, observing and dynamically adapting wherein the first computer system and second computer system are physically separate and the step of performing is a service for the first party, and wherein the steps of the method are performed by one or more computing devices.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 4A and 4B are illustrations of different types of virtual machines wherein FIG. 4A is a virtual machine with a hypervisor and FIG. 4B is a virtual machine with containers and a container engine.

DETAILED DESCRIPTION

Figure 1:
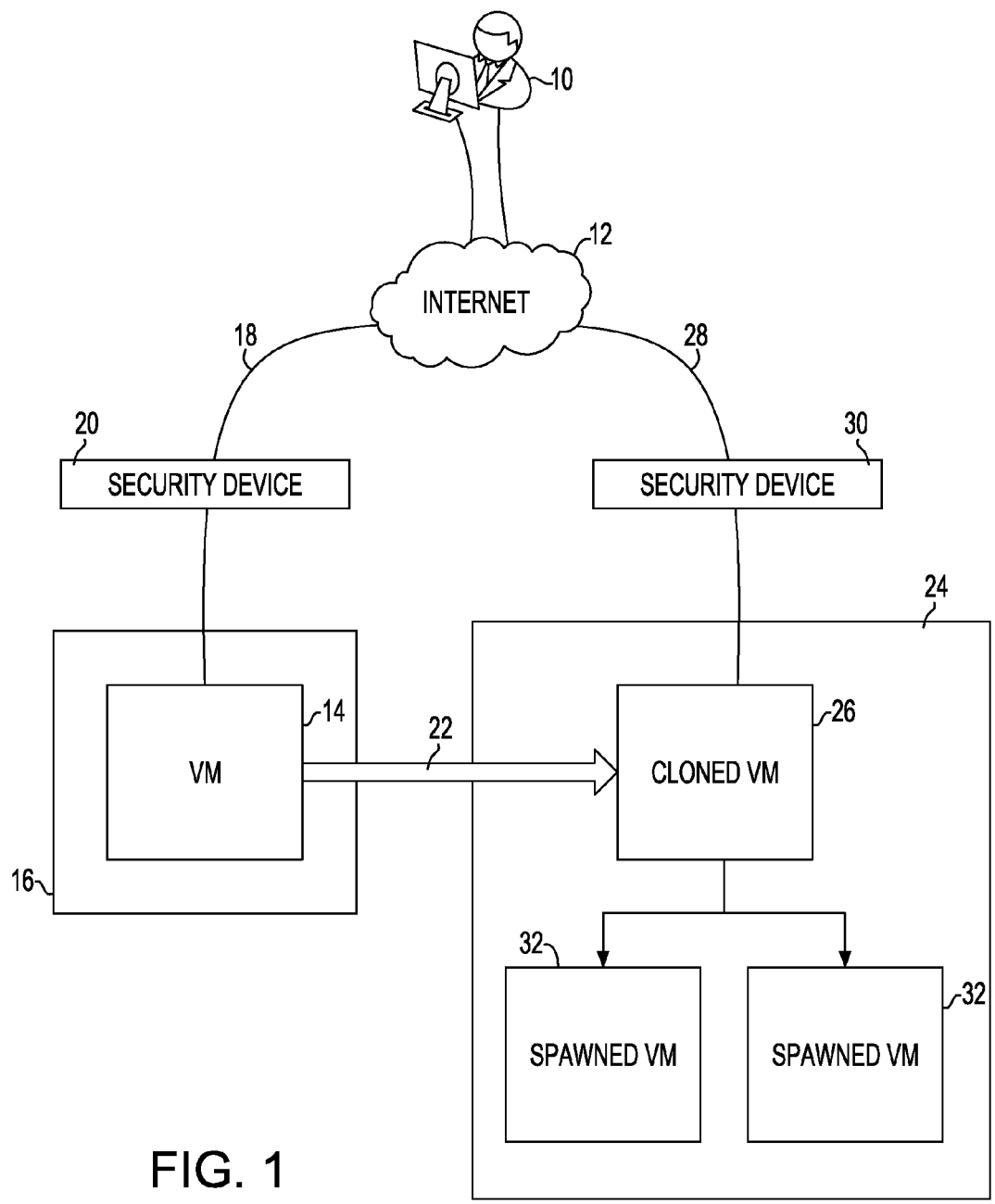
FIG. 1 is an overall view of a virtual machine being attacked by an intruder and cloning the attacked virtual machine to a secure target machine containing the cloned virtual machine.

There are two known solutions for profiling attack behavior. These solutions may be referred to as the "honey pot" and the "sandbox".

A honey pot is a server that has been established explicitly to be attacked or to draw attackers into it—like bees might be attracted to a honey pot. By doing so, intruders may be distracted from actual production servers as they will instinctively focus on the server(s) that appear most vulnerable. The honey pot approach generally has a shortcoming in that it is static and it does not reflect actual production environments so an intruder who was looking for some corporate information or had domain/local knowledge might not necessarily be fooled by the honeypot. If an intruder is specifically targeting a particular server(s) and is not merely opportunistic, the intruder may also not be distracted/deceived by a honeypot and may instead focus on their objective. For example, the intruder may be intending to compromise the mail system and so may focus their efforts on the SMTP gateway and not be distracted into attacking a honey pot server just because it appears to be easily compromisable.

The purpose of sandboxing is to identify and profile incoming malware by convincing it to "execute" in the sandbox. The sandbox then allows the malware to continue its processing so that the characteristics of the malware, such as Command and Control (C&C) server addresses, can be identified. The limitation of sandboxing solutions is that they only allow knowledge of file based malware to be profiled. More general attack scenarios are not supported.

A new solution is required that a) entraps the intruder for a longer period of time so that data can be captured; b) addresses more advanced attack scenarios such as corporate espionage, disgruntled employees or others who possess domain knowledge such that they might not easily be deceived by a honeypot; and c) supports more than file based profiling.

The exemplary embodiments pertain to a system that reacts to a detected intrusion by a) cloning the compromised machine "live" to a controlled environment, and b) continuing to expand and adapt (i.e., evolve) that controlled environment based on the observed and/or predicted behavior of the intrusion. "Live" in this context means that the running (compromised) machine is cloned such that the clone is a runtime/real-time copy of it. While this is happening, the compromised machine continues to function "as is" with any updates/changes that are made while the cloning is occurring subsequently replicated to the clone. At the end of the clone process, the clone machine is an exact replica of the compromised machine. The benefit of a live clone is that it does not do anything to alert the intruder and allows legitimate access to continue unimpeded.

The intruder may continue interacting with the cloned machine once it is copied without awareness that they are now interacting with a copy and not the original. It is possible that, as part of the cloning, any sensitive information or content is removed from the copy or replaced with dummy (i.e., nonsensitive) information or content.

The cloning process may strip sensitive information such that when it copies the compromised machine it only copies aspects/data that are deemed non-sensitive or it may copy the entire machine and then strip the sensitive data after copying. Alternatively, rather than simply strip the sensitive information, the cloning process could replace the sensitive data with either generated data (that resembles the sensitive data in some qualitiative/quantitative way) or data that has been pre-generated or generated based on some rules or heuristics. For example, if the compromised machine contained banking details, the clone might be generated with bogus accounts and values while retaining the same size/structure of the original. All of this would be configurable.

The cloned machine environment may then be dynamically adapted based on the observed/predicted behavior of the intruder. Once inside the sandboxed server, the behavior of the intruder may be observed and, within a secure, contained environment, the cloned machine is dynamically adapted, that is, dynamically modified (through placement of files, injection of kernel and other parameters, and other elements within the virtual machine) and extended (by spawning of networks and other machines that the intruder(s) may then explore) based on the observed/predicted behavior of the intruder. "Dynamically adapted" means the cloned machine is adapted (or evolved) in real time to perform activities of predicted interest to the illicit intrusion based on the observed activities of the illicit intrusion and to also generate data and exhibit behaviors/display characteristics based on the predicted interests of the intruder based on their observed activities.

For example, if an intruder was found to be probing the network for a server called "Accounting", the sandbox could spawn a server with this name; if an intruder was observed searching for a type of data, it could insert data of this type (non-sensitive) to distract the intruder; or if the intruder was attempting to guess the password for a particular user account, the system might let the intruder gain access with a guessed password to further ensnare the intruder and further the illusion that they have progressed towards their objectives (allowing more time to capture evidence/understand their behavior). All of these activities are dynamically generated in responsive to predicted and/or observed activities/behaviors of the intruder.

Each machine that is spawned responsive to the intruder's behavior is itself a honey pot. While the intruder is interacting with these sandboxed devices, the intruder is being recorded, and alerts triggered; or, if an intruder is observed running grep or find commands on a server for specific data elements, files containing these elements could be automatically created and/or copied from a library and/or spawned such that it leads the intruder to falsely believe that the intruder has found something of interest.

There are several advantages of the exemplary embodiments over the known solutions. First, the exemplary embodiments provide a method wherein a "live" intrusion is copied to a dynamically generated sandbox. By "live intrusion", we mean an in-flight intrusion wherein the intruder is actively logged onto or probing the compromised server/device. It doesn't happen after the fact but in "real time". By doing so, the risk of harm to production data and environments is mitigated while simultaneously addressing the need to continue to monitor the intrusion to gain knowledge of the attack vector and also trace the intruder and build a legal case.

Second, the controlled environment around this sandboxed node is dynamically generated based on the intruder's own behavior. By doing so, the intruder will continue to keep interacting with it and, if the intruder is searching for specific data, the intruder may continue to believe that this data is within their grasp.

Third, the intruder continues to interact with the sandboxed cloned machine in the controlled environment while the intruder is tracked. The intruder is unaware that they are interacting with a clone of the production server that was originally attacked by the intruder.

Referring to the Figures in more detail, and particularly referring to FIG. 1, there is disclosed an intruder 10 who via the internet 12 is attempting to gain illicit access to a server or computer machine. The server or computer machine may be a physical computer (as might be the case for individuals or small businesses) or a virtual machine (as might be the case for larger businesses and organizations). Virtual machines of many types are well known and are considered to be an emulation of a particular computer system. The present discussion of the exemplary embodiments focuses on virtual machines but it should be understood that the exemplary embodiments are equally applicable to physical computers without virtual machines.

The virtual machine under attack in FIG. 1 is virtual machine 14. A physical computer device such as a server 16 may be hosting virtual machine 14.

Illicit access in the present context means unauthorized access to a computer, whether a virtual machine or a physical computer device. The intruder 10 may gain illicit access to the virtual machine 14 through a number of ways, such as via SQL injection, brute-force hacking of a password, or some other method. The intruder's network traffic 18 flows through a security device 20, such as a firewall or IPS, that is monitoring the network traffic flow and the intruder's interactions with the virtual machine 14.

Once the intrusion is detected, the virtual machine 14 may be cloned and moved to a controlled environment. The controlled environment in FIG. 1 is a separate physical environment, such as another physical server 24. Cloned virtual machine 26 is shown hosted on physical server 24.

While FIG. 1 shows the cloned virtual machine 26 hosted on physical server 24 so as to be physically separate from physical server 16, this physical separation is not always necessary. The "controlled environment" where the cloning occurs need not be another physical environment but may be an environment where there are sufficient "barriers"—logical or physical—such that the intruder cannot become aware of what has happened or somehow re-compromise the original server. That is, in one exemplary embodiment, the controlled environment may be a virtual machine on the same physical computer, such as server 16, as the compromised virtual machine, such as virtual machine 14, so long as there are sufficient logical barriers between the virtual machine 14 and the cloned virtual machine.

Depending on the policies associated with the physical server 24 (hereafter the "target machine"), not all content (such as content flagged as sensitive) may be copied to the cloned virtual machine 26. By removing the sensitive content, the intruder's ability to impact production data is removed yet they are unaware that they are now contained within a dynamically generated honeypot/sandbox. The sensitive content may be removed before or after cloning.

The process for cloning the virtual machine 14 may be as follows. Virtual machine 26 may be created in the controlled environment, in this case on physical server 24. Each memory page from virtual machine 14 is copied across to virtual machine 26 via a network connection 22. In order for the cloning to occur in a timely enough manner, there should be enough bandwidth and sufficiently low latency between the compromised machine (source) and the target/clone virtual machine. Upon completion of the copying of the memory pages, the memory on virtual machine 14 is again checked and any pages that changed since the last iteration are also moved over to virtual machine 26. This process of copying memory pages continues until the now cloned virtual machine 26 is in synchronization with virtual machine 14. If the intruder 10 has altered any content in the virtual machine 14, the altered files or other content may be reverted back to a snapshot that was taken prior to the intrusion occurring.

The cloning process may take minutes but the time for the cloning process depends on the size of data being cloned and speed of network. During this time, the intruder continues to access the compromised machine. The point at which the intrusion is detected is a checkpoint that can then be rolled back to once the intruder has been moved to the cloned machine. Any changes they may have made would therefore be reversed once they are moved to the cloned machine. For example, an intruder hacks into a website; they are detected; a checkpoint is taken; they proceed to deface the website; the virtual machine may be cloned to a new instance; the intruder is then directed to that new instance; the original virtual machine may be reversed to the checkpoint such that the defacement is now no longer there.

All traffic from the intruder 10 is now redirected 28 through security device 30 to the cloned virtual machine 26 via a network device that maps the source IP (or some other distinguishing characteristic of the intruder) to the target IP of the sandboxed target machine 24. There are a number of mechanisms by which the traffic from the intruder 10 can be rerouted to the target machine 24 but one mechanism could be via a network load balancer that receives incoming requests on a VIP (Virtual IP) but routes those that originated from the intruder 10 to the IP of the targeted machine 24. VIP is an IP address that all requests would access and would then be farmed out to backend systems with their own IP addresses based on load balancing rules/heuristics.

Meanwhile, the virtual machine 14 is continuing to run and other users will find themselves accessing and interacting with this virtual machine 14 which is uncompromised by the intruder 10.

While the intruder 10 is interacting with the cloned virtual machine 26, the intruder's intent is being observed/predicted which may occur through the application of a set of rules/heuristics and attempts to place the intruder initially within one of a number of categories based on assumed intent. For example, for purposes of illustration and not limitation, the categories could be: a) defacer/vandal who is looking to modify externally facing web pages and might be detected as the intruder 10 looks for the Apache HTTP document directory or similar; b) theft might be assumed if the intruder 10 is looking for specific file types where such file types might ordinarily be linked to data of commercial value, such as documents, spreadsheets, database tables or similar.

Based on these initial assessments, different types of behaviors may be injected into the cloned virtual machine 26. In the case of an intruder 10 who is probing the network, random virtual machines may be spawned (hereafter spawned virtual machine(s) 32) using a subset of the host names that were the subject of the scan/probe by the intruder 10, created from a template, and may then attract the intruder 10 to execute further attacks. In the case of an intruder 10 who is searching for a specific file, a rule might be triggered to create a file of this type or pull a file from a library of fake files and plant it on the cloned virtual machine 26 or on the spawned virtual machines 32. For example, if the intruder 10 was scanning for seismology data in a mining company, the cloned virtual machine 26 might deploy some large files of the requested type with very enticing names. It is also within the scope of the exemplary embodiments that the files that are created/generated themselves contain agents or code that, when the intruder 10 downloads and executes these files, capture further information about the intruder's environment, location, etc. All of these behaviors may be defined by rules.

While all of the interactions with the intruder 10 have been going on, alerts have been raised and all of the interactions between the intruder 10 and the cloned virtual machine 26 are recorded, including low level function calls and similar. These recorded interactions allow investigators to gather evidence but also allow security analysts to learn about how the intrusion was executed and gain valuable information about vulnerabilities and attack vectors that might ordinarily be unknown to them.

Figure 2:
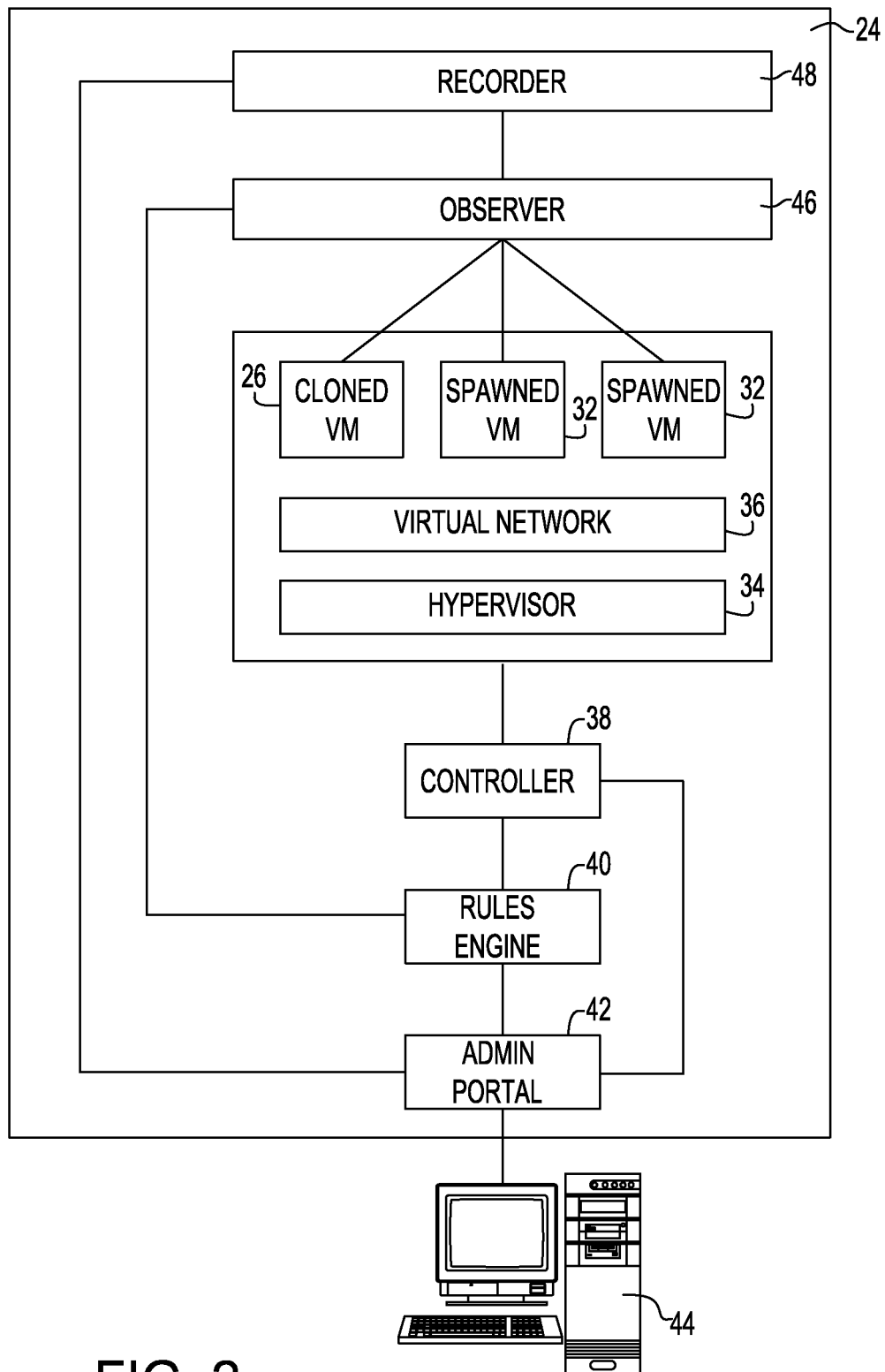
FIG. 2 is a block diagram of the various components of the secure target machine.

Referring now to FIG. 2, there is illustrated one exemplary embodiment of the target machine 24. For purposes of illustration and not limitation, all of the components shown in FIG. 2 are located on target machine 24. As explained hereafter, all of the components shown in FIG. 2 may be distributed among several machines, virtual or physical.

FIG. 2 illustrates a virtual sandbox environment within the target machine 24 and may include a hypervisor 34 or similar component running a virtual network(s) 36 and multiple virtual environments running on the hypervisor 34. One of these virtual environments is the cloned virtual machine 26 and others of the virtual environments may be the spawned virtual machines 32 which may have been dynamically generated in response to predicted/observed activities and behaviors of the intruder. It should be understood that the exemplary embodiments should not be limited to the virtual machine and hypervisor components illustrated in FIG. 2 as other virtual machine implementations should work as well.

There may be a controller component 38 that interfaces with the hypervisor 34 in order to create new virtual machines, configure them, create and configure VLANs (virtual local area networks) on the virtual network 36, and also inject components/files/data into running virtual machines (among other things). The controller 38 may be administered directly via an administrative portal 42.

The administrative portal 42 may be a component that is responsible for orchestrating/managing the creation of the cloned environments.

A user may access the administrative portal 42 through physical computer 44. Alternatively, the controller 38 may have environments and features auto-created based on pre-defined rules. These rules may be persisted and orchestrated via the rules engine 40. Rules may be created manually or may be based on observed behavior in the environment. The activities that the intruder 10 performs may be monitored by the observer component 46.

The observer component 46 may interface with the spawned VM at an operating system level or hypervisor level. It receives events from these environments that describe what the user is doing and what is occurring on the target machine 24 at the time. The observer component may then generate rules or actions based on what has been observed and what it has been configured initially to do. For example, if the intruder is "pinging" various host names then the observer component 46 may observe this, conclude the intent was to seek out other hosts to penetrate, and may be configured to autogenerate hosts that have the name of one or more of the host names that the intruder was pinging. This would 'trick' the intruder into believing they have hit upon a legitimate host and would ensnare them further as they try to then compromise this generated host. Another example might be if an intruder is observed searching a filesystem for files containing a certain text string then the observer component 46 might autogenerate files that contain this string to further confuse or distract the intruder.

The observer component 46 uses these observed behaviors to create rules in the rules engine 40 but the observer component 46 may also interface with a recorder component 48 that records all of the intruder's interactions in a secure storage environment such that the intruder's recorded actions may be used for evidentiary purposes later on.

The recorder component 48 may have hooks into the operating system of the virtual machine, either directly into the OS or via the hypervisor, and may record:

System calls. This would essentially capture all activities that the system performed, including those initiated by the user or by files uploaded and executed by the intruder. For example, it could capture the installation of viruses, deletion of files, etc.

User actions. This would capture all commands entered on the system, user actions undertaken while logged in, etc. For example, if it is a UNIX system, and the user accessed a shell, all of the commands they execute in this shell would be stored.

Screenshots. Screenshots or recordings of screen interactions could also be stored.

Data transfers. This would capture all data moved in/out via the network. This would, for example, capture the exfiltration of files.

All of these events may be timestamped and digitally signed to ensure their integrity for use for evidentiary purposes. The system may also send data or retrieve data from other logging or security devices, such as firewalls, security event log managers and so on, so that a complete view can be constructed of all actions taken by the intruder.

The recordings may be played back via the administrative portal 42.

The exemplary embodiments may further include additional features.

In one exemplary embodiment, a cloud-based service may be offered to third parties in which the virtual machine and associated sandbox may be hosted in a cloud-based service that is physically removed from the target.

Figure 3:
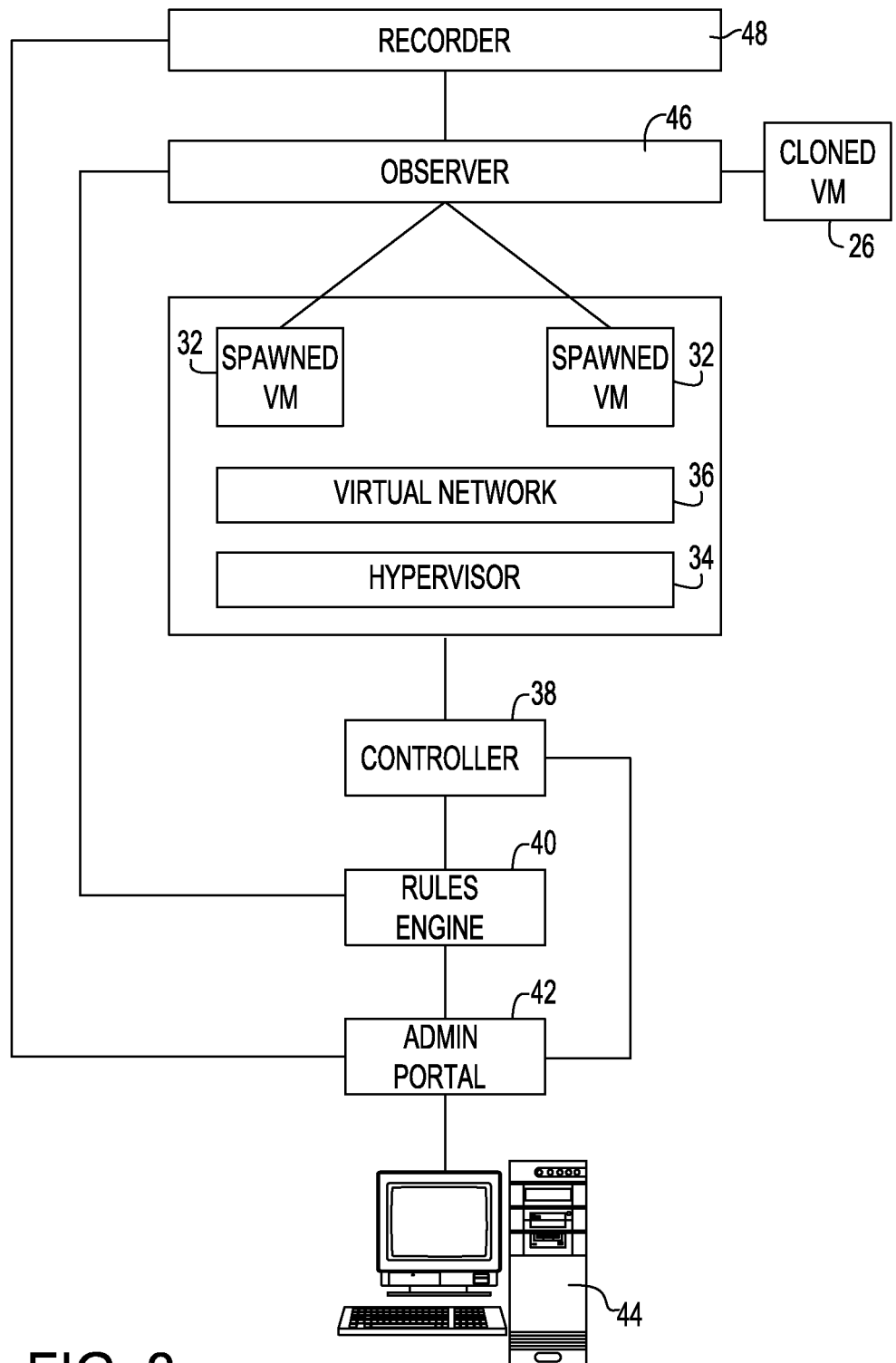
FIG. 3 is a block diagram of the various components of FIG. 2 in a distributed environment.

The target machine 24 may be entirely on customer premises or the target machine 24 could be hosted in the cloud "as a service" so that the cloned virtual machine is then in a third party cloud service. In one variation, all of the components are in the cloud and, in another variation, just the target cloned virtual machine is in the cloud. In this latter scenario, a customer would procure the observer components and associated components shown in FIG. 2 and install them locally along with a subscription to the cloud-based service that is hosting the cloned virtual machine. In this regard, FIG. 2 has been redrawn to delete the limitation of all components being on the same target machine. Thus, FIG. 3 illustrates that the various components may be distributed so that some of the components may be installed locally while others of the components may be installed remotely.

Figure 4A:
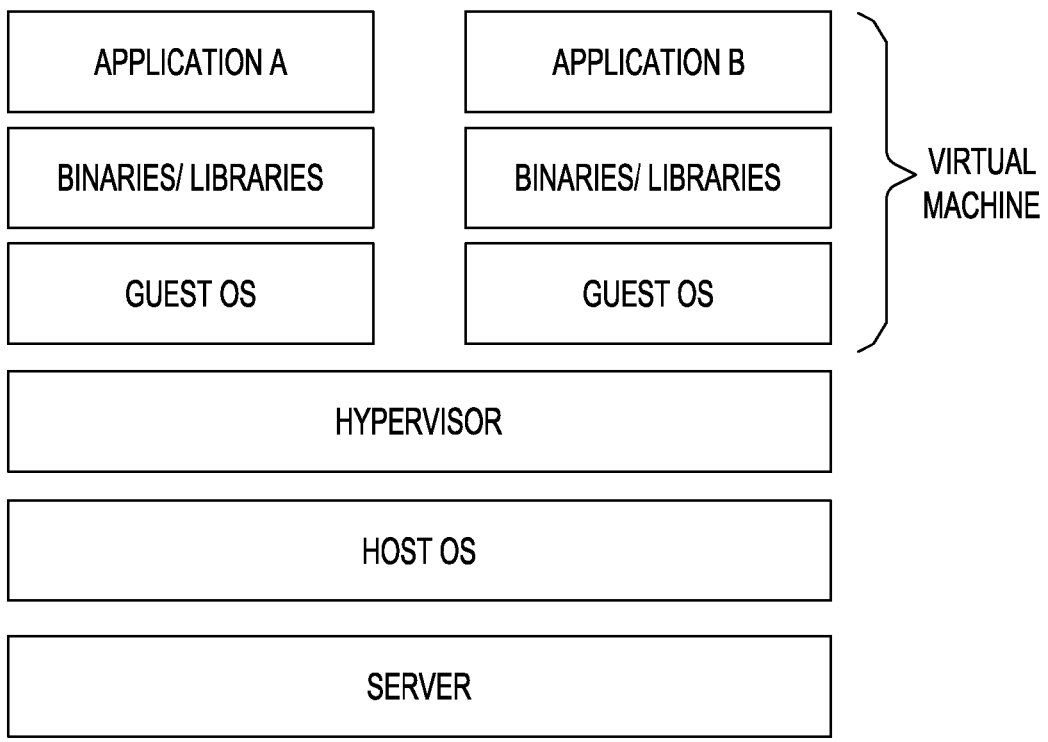
Figure 4B:
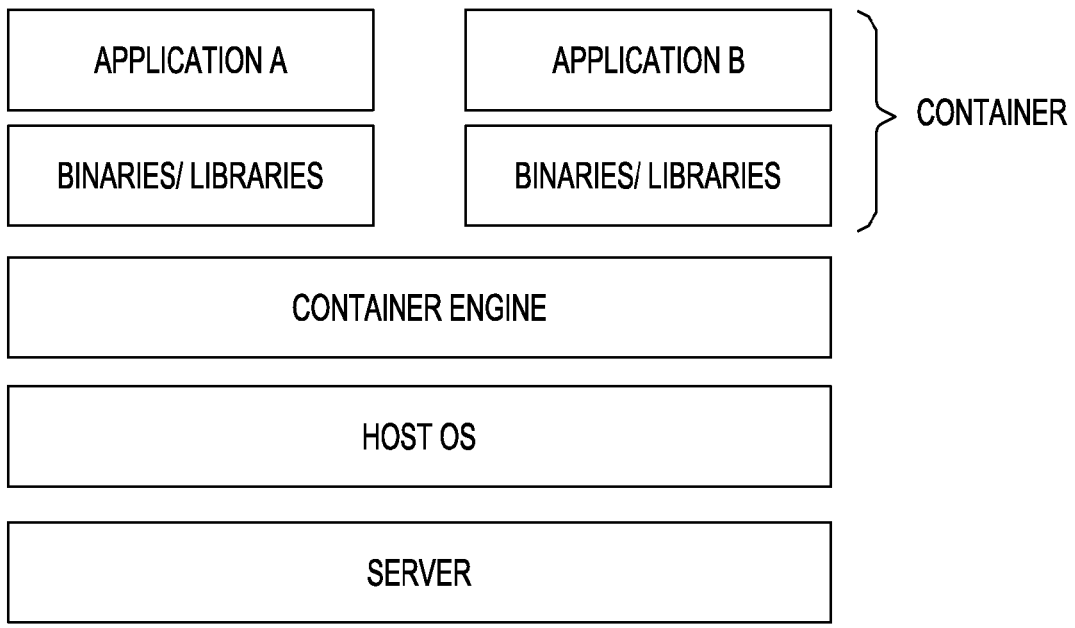

In another variation, the spawned virtual machines could be containers running within an already running instance of the operating system. In this case, the attacker would continue to interact with the same physical server/OS instance but they start interacting with a virtual container—containing the same content—that is running on top of the original OS. In this embodiment, the container might not necessarily replicate the OS exactly but could instead just store the changes and act as intermediary layer between the OS/filesystem and the attacker so that when the attacker edits a file, the changes are stored in this container and not the actual file; and when the file is again requested by the attacker, the delta, in terms of bytes, is applied to the source file and the edited file is presented Shown in FIG. 4A is an exemplary embodiment of a virtual machine (hypervisor-based virtualization) and FIG. 4B is an example of an exemplary embodiment of a container (container-based virtualization). Docker (Docker, Inc.) and Linux containers are examples of container-based virtualization. In container-based virtualization, the operating system is abstracted such that multiple instances of an application/kernel run on a single operating system instance; whereas, in hypervisor-based virtualization, the hardware is abstracted and so multiple instances of an operating system run on a single hardware instance. In both cases, it can be generalized to virtualization or virtual machines. Thus, the exemplary embodiments may utilize virtual machines—regardless of whether they are running as a container or whether they are running directly within a hypervisor.

In one exemplary embodiment, the target machine 24 may not need to be a stand-alone physical computer and may instead be embedded within security device 30 or other in-line network device.

In one exemplary embodiment, the intrusion(s) executed by the intruder 10 may be recorded and reverse engineered to either OS calls or function calls within the OS or the targeted application. The recorded and reverse engineered intrusions may then be used to develop signatures that may be used to either detect and/or block the use of this attack vector.

In one exemplary embodiment, the sandboxed cloned virtual machine 26 may be dynamically moved to law enforcement itself. Upon detection, a migration of the cloned virtual machine 26 may be executed from the sandbox hypervisor 34 to a target law enforcement environment. Alternatively, rather than move the compromised running virtual machine 14 to a contained environment such as target machine 26, the running virtual machine 14 may be moved directly to law enforcement via a "virtual 911" call. Law enforcement may then record the interactions and execute more advanced techniques/technologies to trace the origin of the intrusion.

In one exemplary embodiment, the intrusion protection as described herein may be provided as a service by an internet service provider, telecom service or other entity that is in-line between the intruder 10 and the attacked. For example, using variations of Deep Packet Inspection (DPI), the service could detect that an intrusion has occurred and execute the diversion to a dynamically generated sandbox which may be hosted in the cloud.

Figure 5:
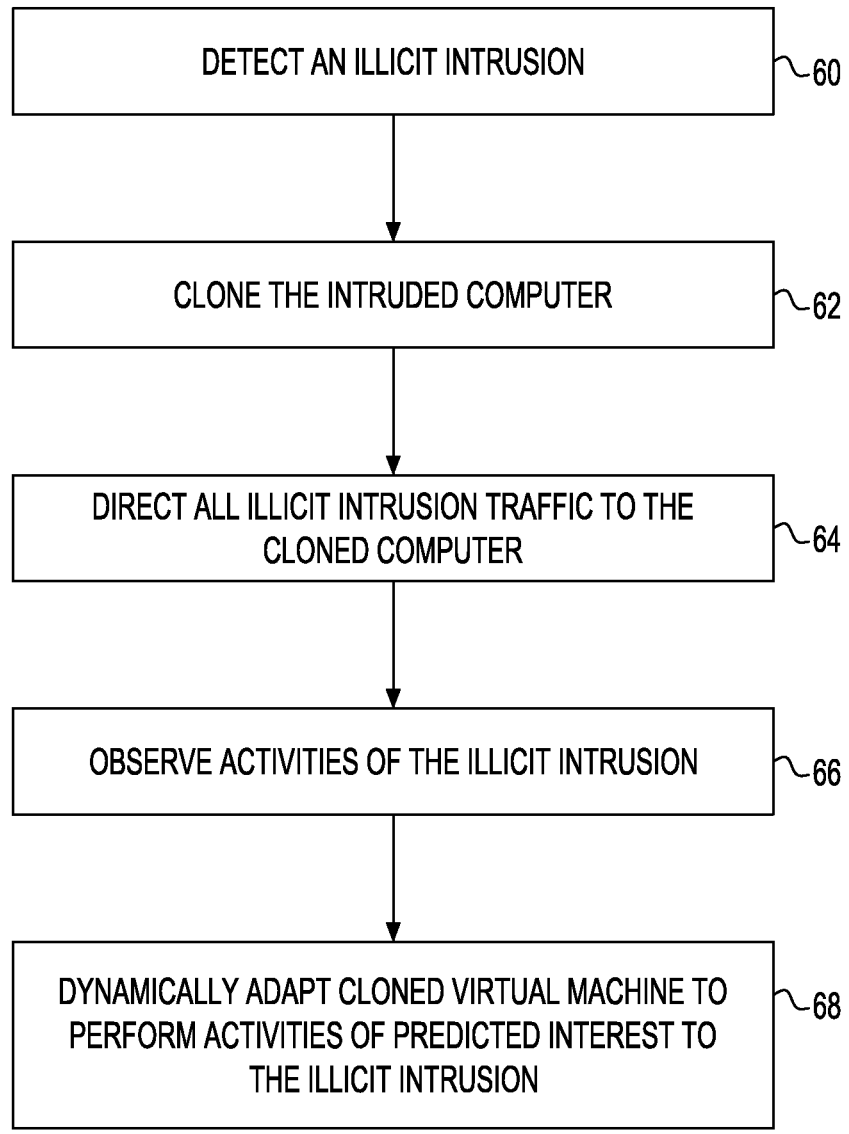
FIG. 5 is a flow chart illustrating one exemplary method of security sandboxing.

Referring now to FIG. 5, there is illustrated a security sandboxing method according to the exemplary embodiments. In the method, an illicit intrusion to a computer on a first computer system is detected, box 60. The intruded computer is cloned, box 62, and preferably moved to a secure, computer environment that is separate (physically or logically) from the computer environment that is hosting the intruded computer. All traffic from the illicit intrusion is directed to the cloned computer, box 64. Activities of the illicit intrusion interacting with the cloned computer are then observed, box 66. Lastly, the cloned computer is dynamically adapted to perform activities of predicted interest to the illicit intrusion based on the observed activities of the illicit intrusion, box 68.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of security sandboxing comprising:
   detecting by a computer an illicit intrusion to the computer on a first computer system;
   responsive to detecting the illicit intrusion to the computer, cloning the computer to create a copy of the computer;
   redirecting all traffic from the illicit intrusion to the computer to the cloned computer while directing all traffic not from the illicit intrusion to the computer;
   observing activities of the illicit intrusion interacting with the cloned computer while directing all traffic not from the illicit intrusion to the computer; and
   dynamically adapting the cloned computer to perform activities of predicted interest to the illicit intrusion based on the observed activities of the illicit intrusion on the cloned computer while directing all traffic not from the illicit intrusion to the computer,
   wherein the computer is a virtual machine and the cloned computer is a cloned virtual machine,
   wherein responsive to activities of the illicit intrusion interacting with the cloned virtual machine, further comprising spawning additional virtual machines on the second computer system supplementing the cloned virtual machine to perform activities of predicted interest to the illicit intrusion, and
   wherein the steps of the method are performed by one or more computing devices.

2. The method of claim 1 wherein cloning the virtual machine comprises:
   creating a new virtual machine to form a cloned virtual machine;
   moving the cloned virtual machine to a second computer system that is logically or physically separate from the first computer system; and
   copying memory pages from the virtual machine to the cloned virtual machine until the virtual machine and the cloned virtual machine are synchronized.

3. The method of claim 1 further comprising injecting behaviors in the form of components, files, data and vulnerabilities into the cloned virtual machine to satisfy the activities of the illicit intrusion interacting with the cloned virtual machine.

4. The method of claim 1 further comprising removing sensitive information from the virtual machine before copying memory pages to the cloned virtual machine.

5. The method of claim 4 further comprising adding nonsensitive information to the cloned virtual machine to replace the removed sensitive information.

6. The method of claim 1 further comprising recording activities of the illicit intrusion.

7. The method of claim 3 wherein at least some of the injecting behaviors contain agents or code to capture information from the illicit intrusion when the behaviors are downloaded by the illicit intrusion.

8. The method of claim 1 wherein dynamically adapting includes adapting the cloned machine in real time to perform activities of predicted interest to the illicit intrusion based on the observed activities of the illicit intrusion.

9. The method of claim 8 wherein dynamically adapting further includes generating data and exhibiting behaviors/display characteristics based on the predicted interests of the intruder based on their observed activities.

10. A computer program product for dynamic security sandboxing based on intruder intent, the computer program product comprising:
    a non-transitory computer readable storage medium having computer readable program code embodied therewith, the computer readable program code comprising:
    computer readable program code configured to detect an illicit intrusion to a computer on a first computer system;
    responsive to an illicit intrusion detected to the computer, computer readable program code configured to clone the computer to create a copy of the computer;
    computer readable program code configured to redirect all traffic from the illicit intrusion to the computer to the cloned computer while all traffic not from the illicit intrusion is directed to the computer;
    computer readable program configured to observe activities of the illicit intrusion interacting with the cloned computer while directing all traffic not from the illicit intrusion to the computer; and
    computer readable program code configured to dynamically adapt the cloned computer to perform activities of predicted interest to the illicit intrusion based on the observed activities of the illicit intrusion on the cloned computer while all traffic not from the illicit intrusion is directed to the computer, wherein the computer is a virtual machine and the cloned computer is a cloned virtual machine and wherein responsive to activities of the illicit intrusion interacting with the cloned virtual machine, further comprising computer program product to spawn additional virtual machines on the second computer system supplementing the cloned virtual machine to perform activities of predicted interest to the illicit intrusion.

11. The computer program product of claim 10 wherein cloning the virtual machine comprises:

computer readable program code configured to create a new virtual machine to form a cloned virtual machine;

computer readable program code configured to move the cloned virtual machine to a second computer system that is logically or physically separate from the first computer system; and computer readable program code configured to copy memory pages from the virtual machine to the cloned virtual machine until the virtual machine and the cloned virtual machine are synchronized.

12. The computer program product of claim 10 further comprising computer readable program code configured to inject behaviors in the form of components, files, data and vulnerabilities into the cloned virtual machine to satisfy the activities of the illicit intrusion interacting with the cloned virtual machine.

13. The computer program product of claim 10 wherein computer program product to dynamically adapting includes computer program product to adapt the cloned machine in real time to perform activities of predicted interest to the illicit intrusion based on the observed activities of the illicit intrusion.

14. The computer program product of claim 13 wherein computer program product to dynamically adapt further includes computer program product to generate data and exhibit behaviors/display characteristics based on the predicted interests of the intruder based on their observed activities.

15. A method of providing a security sandboxing service to a first party comprising:

detecting by a computer an illicit intrusion to the computer on a first computer system of the first party;

responsive to detecting the illicit intrusion to the computer, cloning the computer to create a copy of the computer;

redirecting all traffic from the illicit intrusion to the computer to the cloned computer while directing all traffic not from the illicit intrusion to the computer;

observing activities of the illicit intrusion interacting with the cloned computer while directing all traffic not from the illicit intrusion to the intruded computer; and dynamically adapting the cloned computer to perform activities of predicted interest to the illicit intrusion based on the observed activities of the illicit intrusion on the cloned computer while directing all traffic not from the illicit intrusion to the intruded computer; and performing on a second computer system of a second party the steps of detecting, cloning, directing, observing and dynamically adapting wherein the first computer system and second computer system are physically separate, the step of performing is a service by the second party for the first party, and the first party is different from the second party, wherein the computer is a virtual machine and the cloned computer is a cloned virtual machine, wherein responsive to activities of the illicit intrusion interacting with the cloned virtual machine, further comprising spawning additional virtual machines on the second computer system supplementing the cloned virtual machine to perform activities of predicted interest to the illicit intrusion, and wherein the steps of the method are performed by one or more computing devices.

* * * * *